Feb. 7, 1961  E. E. HETTEEN  2,970,662
MOTOR PROPELLED SLED

Filed Sept. 8, 1958  4 Sheets-Sheet 1

INVENTOR.
EDGAR E. HETTEEN
BY
Moore, White & Burd
ATTORNEYS

Feb. 7, 1961

E. E. HETTEEN 2,970,662

MOTOR PROPELLED SLED

Filed Sept. 8, 1958

INVENTOR.
EDGAR E. HETTEEN
BY
Moore, White & Burd
ATTORNEYS

United States Patent Office 2,970,662
Patented Feb. 7, 1961

2,970,662
MOTOR PROPELLED SLED

Edgar E. Hetteen, Roseau, Minn., assignor to Polaris Industries, Inc., Roseau, Minn., a corporation of Minnesota Filed Sept. 8, 1958, Ser. No. 759,584

10 Claims. (Cl. 180—5)

This invention relates generally to self-propelled snow and ice vehicles, and pertains more particularly to a runner-equipped vehicle employing a propulsion unit of the cleated belt or caterpillar tread variety.

With snow and ice vehicles of the above type, a high degree of maneuverability is desired and certain attempts have been made in prior art devices to improve this characteristic. Some success has, of course, attended these attempts but much still remains to be achieved. Actually, various factors enter into the realization of better maneuverability. Among these factors are enhanced traction, steering and ease of manually moving the vehicle when circumstances so dictate. It is with these alluded to factors that the present invention is concerned.

Accordingly, it may be stated that the primary object of the invention is to improve generally the maneuverability of a snow and ice vehicle having an endless belt type of power drive. More specifically, it is an aim of the invention to overcome certain shortcomings dealing principally with steering, traction during normal operation, the regaining of lost traction resulting from extreme unevenness of terrain, coasting, manual shifting of the vehicle from one position to another, and towing of the vehicle when the traction unit becomes disabled. Moreover, the invention realizes the foregoing attributes simply, economically and without increasing the vehicle's overall weight or size.

Other objects and advantages of the invention will hereinafter appear, and for purposes of illustration, but not of limitation, an embodiment of the invention is shown on the accompanying drawings in which.

Figure 1:
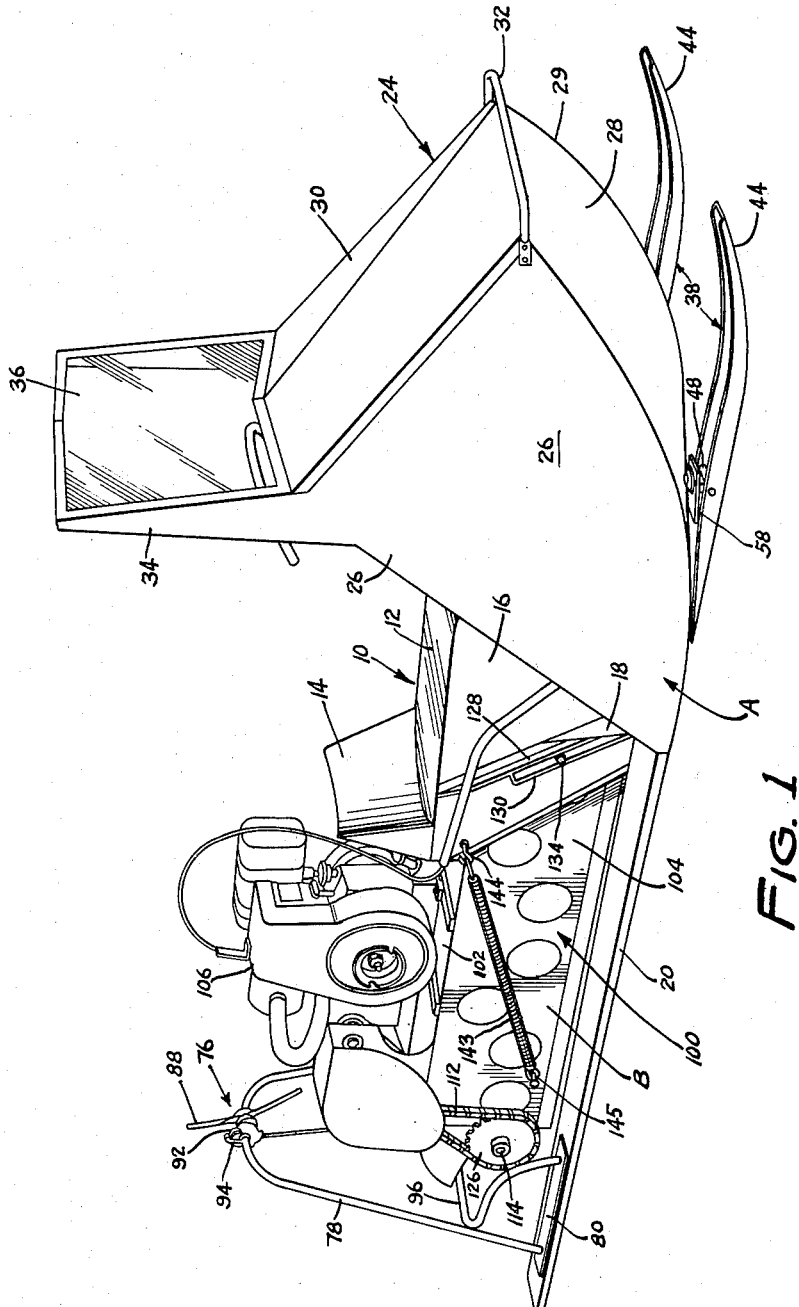
Figure 1 is a perspective view of my snow and ice vehicle as it would appear during normal operation.

Referring now in detail to the drawings the snow and ice vehicle selected for exemplifying the invention may be said to comprise two basic units: a sledge unit A and a power or traction unit B.

The sledge unit A comprises a body portion 10 having a seat 12 with a back rest 14 for accommodating the operator, the seat having downwardly extending side panels 16 and outwardly issuing gussets 18 for imparting increased rigidity to the body. The sides 16 and gussets 18 are suitably secured to a pair of rearwardly directed, laterally spaced base runners 20 which form an opening 22 diverging or increasing in width as it extends toward the rear of the vehicle.

The sledge unit A further comprises a nose portion 24 including vertical side panels 26 and a snow engaging bow composed of upwardly and inwardly inclining sections 28. As best viewed in Figures 3 and 4, these sections 28 form a bow that is angularly configured, having a centrally located apex denoted by the numeral 29. The opening that would otherwise exist between the upper edges of the side panels 26 and the bow sections 28 is covered by a closure panel 30. Anchored to the sides 26 and straddling the forward end of the nose portion 24 is a U-shaped hand grip or tow bar 32. The nose portion 24 also includes an upstanding frame 34 containing a windshield 36.

Figure 5:
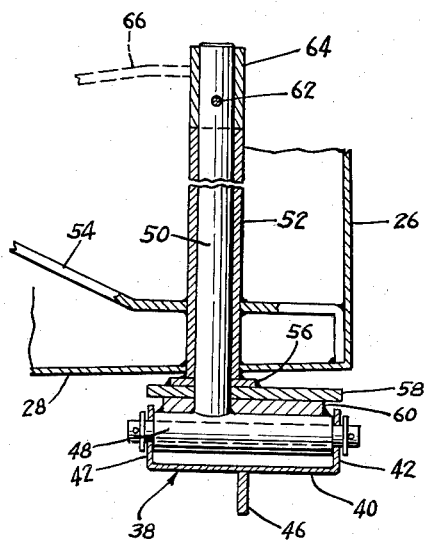
Figure 5 is a detail sectional view taken in the direction of line 5—5 of Figure 4 to illustrate the manner in which one of the steering runners is mounted.

Subjacent the nose portion 24 is a pair of steering runners 38 which are channel-shaped in cross section as can best be seen from Figure 5. Owing to their channel-shaped appearance each runner has a flat bottom or web section 40 and vertical sides 42. These runners 38 curve upwardly at their toe ends 44 and have downwardly projecting keel sections or guides 46 extending along the major portion of their bottom surfaces.

Through the agency of a transverse pin 48 (Figure 5) journaled in the upstanding sides 42 each runner is mounted for pivotal movement in a vertical plane. Integral with each transverse pin 48 is a vertical king pin 50 journaled in a tubular bearing 52 fixedly secured to each section 28 and a cross brace 54. The lower end of each tubular bearing 52 is provided with an annular flange 56 and directly beneath said flange is a bearing wear plate 58 welded thereto. The wear plate 58 rotatably bears against a bearing wear block 60 that is mounted directly above the transverse pin 48 by welding. Attached to the upper end of each king pin 50, as by a press fitted pin 62 extending completely through said king pin, is a collar 64. Owing to the collar 64, which of course is rotatable relative to the tubular bearing 52, the king pin 50 is held captive.

It will be observed that the transverse pin 48, and hence the king pin 50 too, is situated nearer the heel or rear end of each steering runner 38 which facilitates steering. A further steering advantage is realized through the medium of relatively long, rearwardly directed knuckle arms 66 which are each secured to the collars 64. Tie rods 68 are articulatively connected to the ends of the arms 66 at one end and to a pair of steering arms 68', 70 at the base of a steering column 72 rotatably supported at the center of the cross brace, a steering wheel 74 being mounted at the upper end of said steering column.

Although the specific role played by a winch generally denoted by the reference numeral 76 will be better understood after presenting a more detailed description of the traction unit B, to complete the description of the sledge unit A the winch mechanism will now be referred to. Accordingly, it can be seen that the winch 76 includes a U-shaped standard or support 78 having its legs secured to base plates 80 which are in turn affixed to the rear ends of the base runners 20. Thus, it will be discerned that the support bridges the rearmost portion of the opening 22. Rotatably carried at the upper or bight section of the support 78 is a windlass 82 about which a cable 84 is wound, the cable having a hook 86 at its free end.

For actuating the windlass 82, a pair of oppositely issuing lever handles 88 are utilized, these handles being fixedly mounted to said windlass. Also fixed to the windlass 82 is a rachet 90 and cooperable therewith is a pawl 92 pivotally mounted on post 94 integral with the support 78.

The base runners can be made from lighter weight stock, it has been found, if their free rear ends are interconnected. While some rigidity is afforded by the support 78, additional rigidity can be obtained through the instrumentality of a U-shaped brace 96 having its ends secured to the previously mentioned plates 80. A dual utilization of this brace 96 is made by providing a hook 98 to which the cable hook 86 can be attached when the winch 76 is not being actively used.

Turning now to the elongated traction unit B, only a general description is believed necessary. In this regard this unit comprises a body portion 100 having an upper platform 102 and downwardly extending side panels 104 that may be apertured to reduce their weight. The platform 102 supports an engine 106 located somewhat aft of the center of the unit. The engine 106 drives a belt 108 which in turn drives a pair of chains 110 and 112, suitable sheaves and cog wheels being provided. A pair of shafts 114 and 116 rotatably carry drums 118 and 120, respectively, about which is entrained an endless belt 122 equipped with a series of spaced cleats (not shown). The shafts 114, 116 are journaled at opposite ends of a frame 124 integral with the body portion 100. It is the rear shaft 114, equipped with a cog wheel 126, that is actually driven by the chain 112. Additional cog wheels, one on either side of each drum 118 and 120, together with interconnecting chains, drive the forward drum 120, but for drawing simplification these additional driving elements have not been pictured, especially since they are not believed necessary to a full comprehension of the invention.

It is readily apparent that the traction unit B is disposed in the opening 22 between the base runners 20. However, a detailed explanation is now needed as to how the traction unit B is coupled or connected to the sledge unit A, as this is a very important feature of the invention. Accordingly, attention is now directed to Figure 2 where a pair of upwardly and rearwardly inclined angle irons 128 and 130 are shown welded or otherwise secured to the body portion 10 of the sledge unit A. Corresponding angles 128, 130 are provided, of course, on the far side, too. A section of each side panel 16 is cut away so that a slot 132 is formed on each side of the unit A. As will presently be made manifest, the angles 128 will shoulder the propulsion loads and, therefore, these angles are preferably backed, and thus reinforced, by the previously mentioned gussets 18.

Stub shafts 134 are mounted on the frame 124, these laterally issuing shafts 134 carrying rollers 136 constrained to follow the slot 132 formed between the flanges of the angle irons 128, 132. By this guide arrangement, the forward end of the traction unit B is urged downwardly during forward movement inasmuch as each roller 136 reacts against its associated angle 128 to produce this downward thrust. Stated somewhat differently, the inclined guides cam their respective rollers 136 downwardly to produce an enhanced traction of the belt 122 with the snow or ice being traversed by the vehicle.

Figure 3:
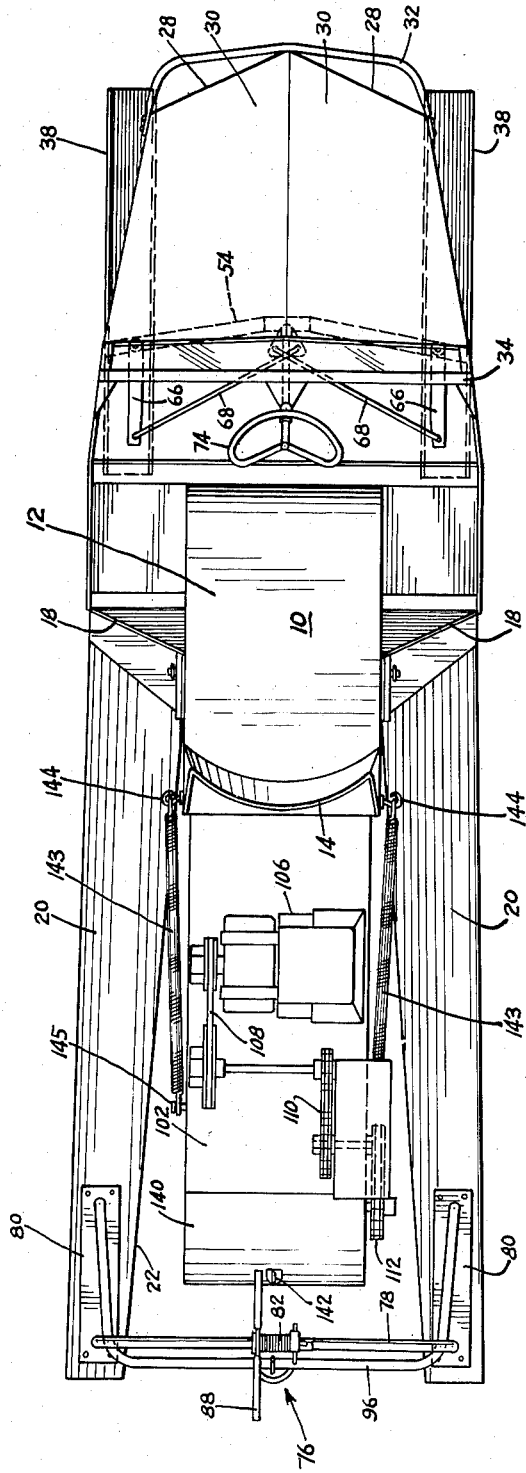
Figure 3 is a plan view of the vehicle.
Figure 4:
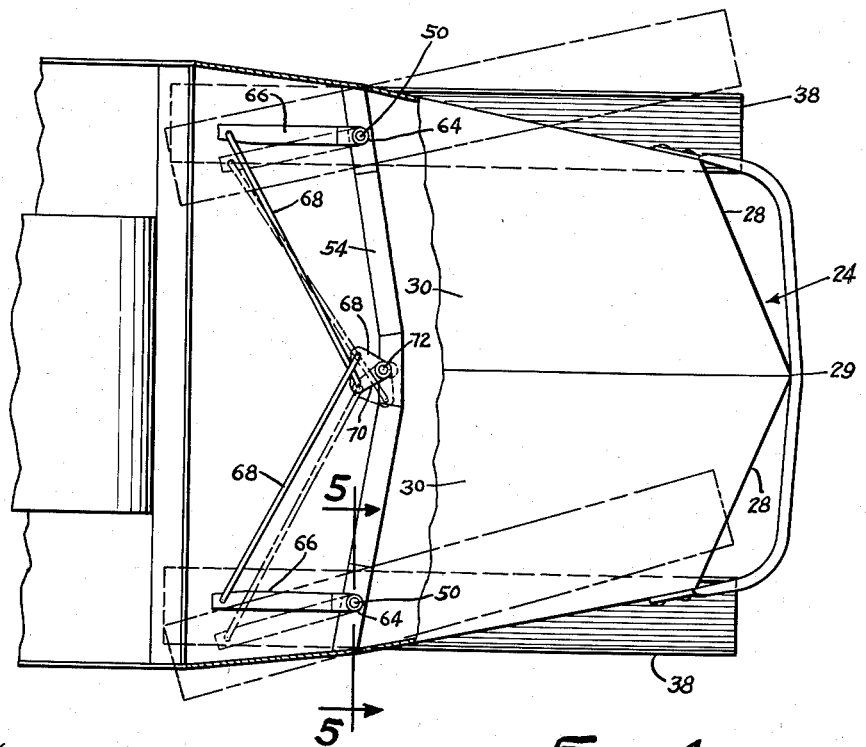
Figure 4 is a somewhat enlarged fragmentary plan view depicting the nose portion of the vehicle and showing to better advantage the steering mechanism.

It is contemplated that the traction unit B will at times need to be held at an elevated position with respect to the base runners 20. A number of conditions may occasion such a need; for instance, the operator may wish to have the vehicle coast downhill in a bobsled fashion, the propulsion unit may become disabled necessitating towing of the vehicle, the vehicle may require manual shifting or turning so that it faces in a different direction, or perhaps traction will be lost with the consequence that snow should be packed by hand under the belt 122. At any rate, provision is made for retaining the forward end at an elevated position by supplying a lock pin 138 at each side having its ends passing through apertures in the guide angles 128, 130. With the engine 106 located somewhat aft of the middle of the traction unit B, little difficulty will be experienced in lifting the forward end a distance sufficiently high so that the pins 138 can be inserted under the rollers 136 when elevated. If desired, a small jack can be placed under the projecting end of each stub shaft 134, Figure 3 illustrating this possibility, although the jacks have not been illustrated.

Mention has already been made of the winch mechanism 76 located at the rear of the sledge unit A. Although this winch is primarily intended for lifting the rear end of the unit B, it can assist in the lifting of the front end, too. In this regard, it will be noted that the traction unit B is provided with a curved rear shield 140 having a hook 142 thereon. Consequently when the cable hook 86 is engaged with the hook 142 to elevate the rear end of the unit B, rotation of the windlass 82 will exert somewhat of a rearward pull on the unit B. Since the angles 130 are rearwardly inclined, the rollers 136 will tend to ride up these sloping surfaces. If the windlass 82 is sufficiently rearward and the inclination of the angles 130 is sufficiently acute, both ends of the traction unit B can be elevated with the winch 76.

In view of the detailed description presented above, the operation of the instant invention will be understood by those familiar with this particular art. However, the benefits derivable from the invention in the form of enhanced maneuverability might be emphasized in conjunction with a brief operational description. During a typical snow run, the vehicle is inherently constrained to follow a straight path owing to the central apex 29 acting in concert with the keel-like guides 46 on the steering runners 38. Should any snow submerged obstacles, such as logs, rocks and the like, be encountered by either or both runners 38, the foremost or toe sections of these runners are capable of being deflected upwardly in a vertical plane because of the hinged effect afforded by the transverse pins 48. In this way either steering runner 38 can ride over the obstacle without subjecting the steering mechanism to forces that would result in a deviation from the intended course. Yet when it is desired to turn the vehicle, the mechanical advantage stemming from the more rearward location of the king pins 50 permit the vehicle's course to be changed quite readily, the sloping bow section 28 on the particular side easily riding up on the snow at that side. Straightening of the runners after the turn is helped by that side section 28 tending to slide down into the snow once again.

Should the resistance to forward advancement of the vehicle be increased, as by the nose portion 24, together with the steering runners 38 sinking deeper into the snow, traction is automatically increased by virtue of the inclined guides 128 and 130, for as already pointed out the angles 128 will cam their rollers 136 downward due to the rearward slope thereof.

Where the terrain is especially rough and uneven, and particularly where the snow is quite soft, there will be times when traction is completely lost. This is where the winch mechanism 76 is most helpful, because for example, if the rear end of the traction unit B has dropped into a ravine or crevice, for instance to the extent shown in phantom outline in Figure 2, this end can be lifted by attaching the cable 84 to the hook 142. Then snow can be hand packed under the belt 122 of the traction unit B to whatever extent is necessary to regain traction, or, if conditions demand, the entire traction unit B can be elevated through the use of the pins 138. Then the vehicle can be manually maneuvered into a different location for travel resumption. Complete elevation of the unit B would also be employed where coasting or towing is contemplated.

It might be stressed at this time that while the cable hook 86 has been shown in engagement with the hook 98 during normal operation, the hook 86 can instead be kept in engagement with the hook 142 so that the rear end of the unit B will not drop into the extreme phantom position that has been depicted. In other words, the winch 76 can be utilized to limit the amount of drop, although some degree of drop is highly desirable in order to compensate for tolerable deviations in the contour of the ground. The slack left in the cable 84 under these assumed conditions will of course determine the amount of drop that can occur.

Figure 2:
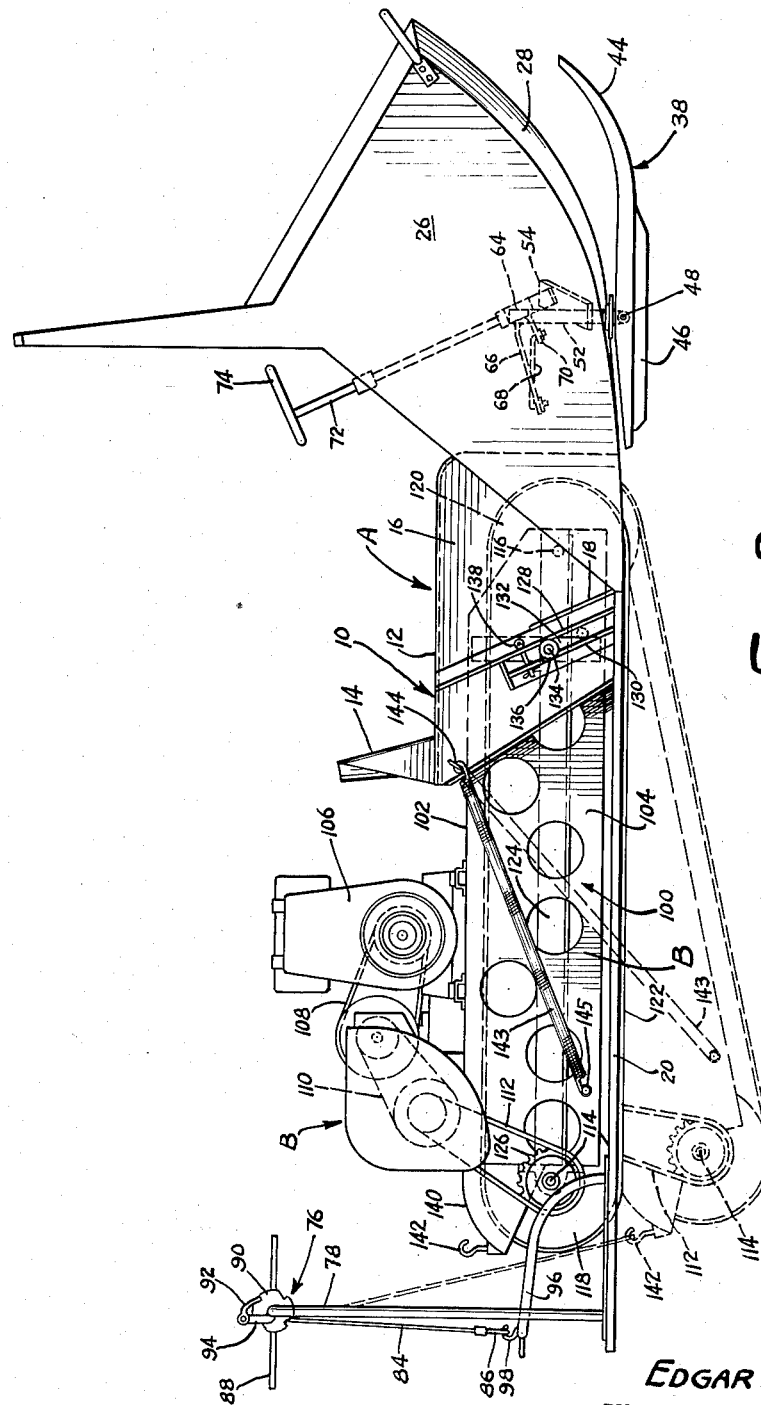
Figure 2 is a side elevational view corresponding to Figure 1 but showing a sunken position of the traction unit in phantom outline, such as would occur when the rear end of the traction unit has settled in deep and exceptionally loose snow.

Another important feature of the invention resides in the provision of means for counteracting a portion of the weight of the rear end portion of the traction unit B, best shown in Figures 1 and 2. To thus counterbalance a portion of the weight of the rear end portion of the traction unit B, a pair of springs 143 are shown interconnected between the front body portion 12 of the supporting frame of the sledge, and the rear end portion of the traction unit, as shown at 144 and 145, respectively.

By thus interconnecting the fixed body 12 of the frame of the sledge to the rear swingable end portion of the traction unit B, a portion of the weight of the traction unit is supported by the springs 143, when the traction unit B tends to sink more deeply into the snow, as will be understood by reference to the dotted lines in Figure 2.

While the foregoing description is intended to illustrate the versatility of my snow and ice vehicle, it is to be understood that changes may be effected in some of the details of construction, arrangement, operation without departing from the spirit of the invention, especially as defined in the appended claims.

What is claimed:

1. A snow and ice vehicle comprising a sledge unit including a body portion for supporting the operator of the vehicle, a pair of rearwardly directed, laterally spaced base runners mounted in fixed relation to said body portion, a nose portion inclining forwardly and inwardly from the forward ends of said base runners to form an angularly configured bow having a centrally located apex when viewed in cross section, a pair of laterally spaced steering runners subjacent said nose portion, means mounting said steering runners for pivotal movement in both horizontal and vertical planes relative to said nose portion, an elongated traction unit disposed between said base runners, means mounting the forward end of the traction unit for relative forward and vertical movements on the sledge unit, means interposed between said traction unit and said sledge unit to impart a downward thrust to a forward portion of the traction unit when said sledge unit is propelled forwardly by said traction unit, and an upstanding winch supported on and bridging the rear ends of said base runners for maintaining the rear end of said traction unit at a preferred elevation with respect to said base runners.

2. A snow vehicle in accordance with claim 1 in which the mounting means for said steering runners includes a transverse pin pivotally connected to each steering runner and a vertical pin integral with each transverse pin, said mounting means further including an upstanding journal bearing in fixed relation with said nose portion for receiving each vertical pin, whereby said transverse pins permit pivotal movement of said steering runners in a vertical plane and said vertical pins permit pivotal movement in a horizontal plane.

3. A snow vehicle in accordance with claim 2 in which said transverse pins are located nearer to the rear ends of said steering runners and the upper ends of said vertical pins have rearwardly directed lever arms fixedly attached thereto for effecting pivotal movement of said steering runners in said horizontal plane.

4. In a snow and ice vehicle of the character described, a sledge unit provided with a pair of spaced base runners, an elongated traction unit disposed between said runners, and means for connecting the forward end portion of said traction unit to said sledge unit including an upwardly and rearwardly inclined guide for constantly urging at least a portion of the traction unit downwardly relative to said runners, when the sledge unit is propelled forwardly by said traction unit.

5. In a snow and ice vehicle of the character described, a sledge unit provided with a pair of spaced base runners, an elongated traction unit disposed between said runners, guide means carried by the sledge unit adjacent the forward end of the traction unit forming an upwardly and rearwardly inclined slot, and a follower member mounted on the forward end of the traction unit movably received in said slot, whereby forward propulsion by said traction unit will urge said follower member in a downward direction in said slot and thus cause the forward end of said traction unit to be forced downwardly relative to said base runners.

6. A snow and ice vehicle in accordance with claim 5 including a winch mechanism mounted on the rear ends of said base runners for maintaining the rear end of said traction unit at a preferred elevation with respect to said base runners.

7. A snow and ice vehicle in accordance with claim 6 including a locking pin insertable through said guide means for maintaining the forward end of said traction unit at a preferred elevation with respect to said base runners.

8. In a snow and ice vehicle of the class described, a sledge unit provided with a supporting frame and having a pair of laterally spaced load-carrying runners secured thereto, an elongated traction unit having its forward end pivoted to the forward end portion of the supporting frame and having its rear end portion mounted for pivotal movement in a vertical plane, means connecting the forward end of said traction unit and said supporting frame permitting pivotal and relative vertical and forward movements of the traction unit on the supporting frame, a power device for operating said traction device, and a pair of spring elements interconnecting the forward end portion of the supporting frame of the sledge to the rear swingable end portion of said traction unit, said spring cooperating to carry a portion of the weight of the traction device, and to improve the traction of the traction unit under certain operating conditions.

9. A snow and ice vehicle comprising a sledge unit including a body portion for supporting the operator of the vehicle, a pair of rearwardly directed, laterally spaced base runners mounted in fixed relation to said body portion, a nose portion inclining forwardly and inwardly from the forward ends of said base runners to form an angularly configured bow having a centrally located apex when viewed in cross section, a pair of laterally spaced steering runners subjacent said nose portion, means mounting said steering runners for pivotal movement in both horizontal and vertical planes relative to said nose portion, an elongated traction unit disposed between said base runners, means interposed between said traction unit and said sledge unit to impart a downward thrust to a portion of the traction unit when said sledge unit is propelled forwardly by said traction unit, an upstanding winch supported on and bridging the rear ends of said base runners for maintaining the rear end of said traction unit at a preferred elevation with respect to said base runners, a pair of laterally spaced guides on said sledge unit adjacent the forward end of said traction unit, and a pair of outwardly directed elements on the forward end of said traction unit slidably received in said guides.

10. A snow and ice vehicle comprising a sledge unit including a body portion for supporting the operator of the vehicle, a pair of rearwardly directed, laterally spaced base runners mounted in fixed relation to said body portion, a nose portion inclining forwardly and inwardly from the forward ends of said base runners to form an angularly configured bow having a centrally located apex when viewed in cross section, a pair of laterally spaced steering runners subjacent said nose portion, means mounting said steering runners for pivotal movement in both horizontal and vertical planes relative to said nose portion, an elongated traction unit disposed between said base runners, means interposed between said traction unit and said sledge unit to impart a downward thrust to a portion of the traction unit when said sledge unit is propelled forwardly by said traction unit, and an upstanding winch supported on and bridging the rear ends of said base runners for maintaining the rear end of said traction unit at a preferred elevation with respect to said base runners, a pair of laterally spaced guides on said sledge unit adjacent the forward end of said traction unit, a pair of outwardly directed elements on the forward end of said traction unit slidably received in said guides, and a lock pin associated with each guide for underlying said elements to support the forward end of the traction unit at a preferred elevation with respect to said base runners.

References Cited in the file of this patent

UNITED STATES PATENTS

| | | |
|---|---|---|
| 1,154,321 | Kinnel | Sept. 21, 1915 |
| 1,293,958 | Smedshammer | Feb. 11, 1919 |
| 2,276,310 | James | Mar. 17, 1942 |
| 2,339,886 | Shannon | Jan. 25, 1944 |
| 2,346,351 | Bombardier | Apr. 11, 1944 |
| 2,617,659 | Grenier | Nov. 11, 1952 |
| 2,702,088 | Klimek | Feb. 15, 1955 |
| 2,827,971 | Stefanka | Mar. 25, 1958 |

FOREIGN PATENTS

| | | |
|---|---|---|
| 282,301 | Germany | Feb. 23, 1915 |